United States Patent Office 3,173,920
Patented Mar. 16, 1965

3,173,920
PROCESS FOR PREPARING 2:2'-DIPYRIDYLS
George Henry Lang, Manchester, England, assignor to Imperial Chemical Industries Limited, London, England, a corporation of Great Britain
No Drawing. Filed July 1, 1963, Ser. No. 292,109
Claims priority, application Great Britain, July 3, 1962, 25,524/62
8 Claims. (Cl. 260—296)

This invention relates to a new process for the manufacture of 2:2'-dipyridyls from pyridine or alkyl pyridines.

2:2'-dipyridyl and certain of its alkyl derivatives are valuable intermediates for the preparation of herbicides and may be prepared by the action of Raney nickel catalyst on pyridine or the appropriate alkylpyridine. The use of this catalyst however introduces a fire hazard, and furthermore the catalyst rapidly loses activity during the reaction and is not capable of regeneration.

We have now found that rhodium, osmium or iridium act as catalysts for the conversion of pyridine into dipyridyls and in comparison with Raney nickel exhibit greater resistance to poisoning and are less hazardous in use.

According to our invention therefore we provide an improved process for the manufacture of 2:2'-dipyridyl and alkyl derivatives thereof from pyridine or an alkylpyridine by heating at a temperature above 100° C. with a catalyst containing rhodium, osmium or iridium in finely divided form.

As alkylpyridines which may be used in the process of our invention there may be mentioned for example any pyridine carrying a lower alkyl group, by which is meant an alkyl group containing not more than six carbon atoms. Two alkyl groups may be present but the groups must not be in both the 2 and 6 positions of the pyridine ring and should not contain altogether more than six carbon atoms. As examples of such alkylpyridines there may be mentioned 3-methyl and 4-methylpyridines which afford respectively 5:5'-dimethyl and 4:4'-dimethyl-2:2'-dipyridyls.

The rhodium, osmium or iridium catalyst may be prepared by conventional methods for example as described on pages 139–141 of "Annotated Bibliography on Ruthenium, Rhodium and Iridium as Catalysts," published by The International Nickel Company, Inc. It is preferred that the catalyst be supported on for example alumina, silica, animal charcoal, asbestos, pumice and kieselguhr, such supported catalyst being prepared by conventional methods such as impregnation with soluble salts followed by reduction with for example formaldehyde, hydrazine, or hydrogen. The catalyst may be in powder or granular form.

The amount of catalyst used influences the rate of reaction. It is preferred to use a quantity of catalyst which, together with any supporting material, is between 1 and 50% of the weight of pyridine.

The preferred temperatures for carrying out the process of our invention are between 250 and 450° C. Temperatures below this range, for example between 100 and 250° C. can be used but give low speeds of conversion, and higher temperatures lead to side reactions.

The process may be carried out by heating the catalyst and pyridine to the desired temperature in an agitated, enclosed vessel capable of withstanding the high pressure produced.

The optimum time of reaction varies wtih the temperature used and the pyridine. Using pyridine itself and 4% or 5% rhodium on alumina catalyst little further reaction takes place after about 10 hours at 300° C. After reaction the catalyst is removed, for example, by filtration.

If desired however the process can be carried out in a continuous manner, for example by circulation continuously over the catalyst of unreacted pyridine recovered from the reaction mixture by distillation, the dipyridyls accumulating in a vessel separate from that containing the catalyst. By adjustment of the pressure, the catalyst can be operated under vapour phase or liquid phase conditions.

The catalyst can be reactivated after use by oxidative and reductive methods or regenerated by solution of the metal for example a mixture of nitric and hydrochloric acids followed by reductive treatment to reprecipitate the metal.

The invention is illustrated but not limited by the following examples in which all parts and percentages are by weight unless otherwise specified.

*Example 1*

1 part of catalyst consisting of 5% rhodium on alumina and 25 parts of pyridine are heated in a sealed glass pressure tube at 300° C. for 10 hours. After cooling the catalyst is removed by filtration to give a solution in pyridine of 2:2'-dipyridyl, corresponding to a rate of production of dipyridyl of 760 parts per hour per 100 parts of rhodium.

*Example 2*

0.5 part of catalyst consisting of 5% rhodium on alumina and 25 parts of 4-methylpyridine are heated in a sealed glass pressure tube at 300° C. for 10 hours. On cooling, the contents become partly solid and are washed out with methanol. The suspension is heated to dissolve the organic material and the catalyst removed by filtration. On concentration and cooling 4:4'-dimethyl-2:2'-dipyridyl crystallises out. The amount obtained was 6.75 parts equivalent to a rate of production of 2700 parts per hour per 100 parts of rhodium.

What I claim is:

1. An improved process for the manufacture of 2:2'-dipyridyl and alkyl derivatives thereof from a first member selected from the group consisting of pyridine and an alkylpyridine by heating said first member at a temperature above 100° C. with catalyst containing a second member selected from the group consisting of rhodium, osmium and iridium in finely divided form.

2. A process as claimed in claim 1 wherein the alkyl group in the alkylpyridine contains not more than six carbon atoms.

3. A process as claimed in claim 2 wherein the alkyl group is a methyl group in the 3-position of the pyridine ring.

4. A process as claimed in claim 1 wherein the temperature is between 250 and 450° C.

5. A process as claimed in claim 1 wherein said second member is supported on a substrate.

6. A process as claimed in claim 1 wherein the amount of catalyst is from 1 to 50% of the weight of pyridine.

7. A process as claimed in claim 1 wherein said first member is brought into contact with the catalyst, removed from the catalyst with further amounts of said first member, separated by distillation from a third member selected from the group consisting of dipyridyl and alkyldipyridyl, and recycled to the catalyst.

8. A process as claimed in claim 2 wherein the alkyl group is a methyl group in the 4-position of the pyridine ring.

References Cited by the Examiner
UNITED STATES PATENTS 3,053,846   9/62   Varcoe _____ 260—296

OTHER REFERENCES

Bond: "Catalysis by Metals," pp. 407–409 (Academic Press) (1962).

Lohse: "Catalytic Chemistry," pp. 149–169, 204–211 (Chemical Publishing Co.) (1945).

WALTER A. MODANCE, *Primary Examiner.*

JOHN D. RANDOLPH, *Examiner.*